Jan. 16, 1951 L. BESS 2,538,500
COINCIDENCE CIRCUIT
Filed Sept. 19, 1945
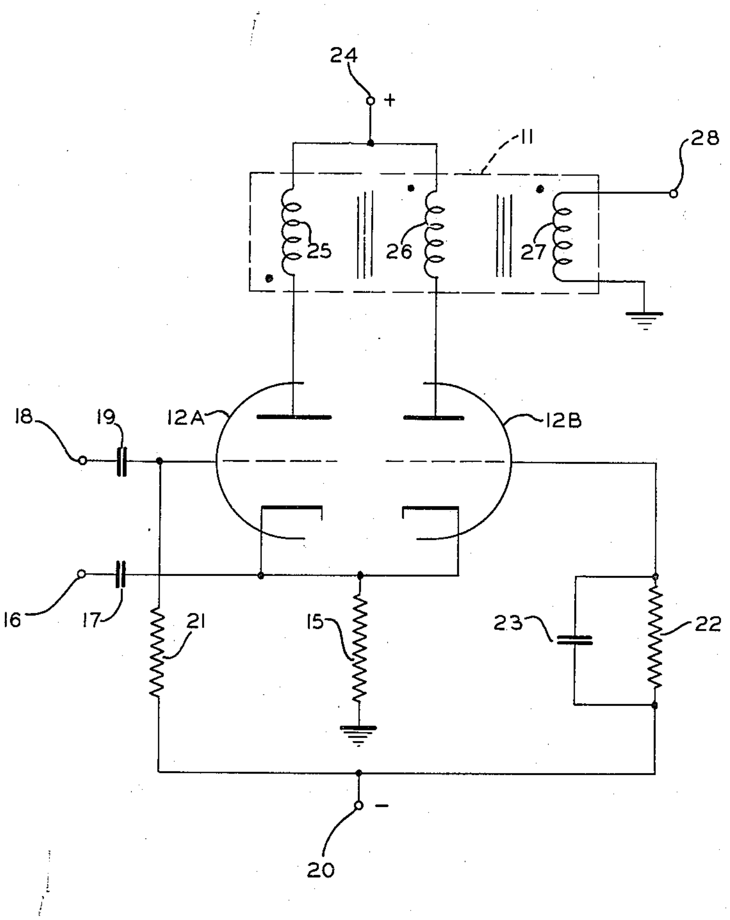
INVENTOR
LEON BESS
BY
Ralph L Chappell
ATTORNEY Patented Jan. 16, 1951 2,538,500

UNITED STATES PATENT OFFICE 2,538,500

COINCIDENCE CIRCUIT

Leon Bess, Boston, Mass., assignor, by mesne assignments, to the United States of America as represented by the Secretary of the Navy Application September 19, 1945, Serial No. 617,372

7 Claims. (Cl. 250—27)

This invention relates to coincidence circuits and more particularly to a push-pull coincidence circuit which operates in the high transconductance region of its component tube's characteristic and thus results in increased sensitivity and gain over that of prior coincidence circuits.

Various types of coincidence circuits are well-known to those skilled in the art and are adaptable to a multiplicity of uses in the field of electronics. All have had the common disadvantage, however, that they were relatively insensitive, would give false operation if overdriven from an input source, possessed only a small gain or amplification characteristic, and further that they would only function with either negative or positive inputs—not both.

Accordingly, one object of this invention is to provide a coincidence circuit which has a high amplification characteristic.

Another object is to provide a coincidence circuit which will operate equally well with negative or positive inputs.

Another object is to provide a "true" coincidence circuit, that is, one in which no amount of overdriving from any one source, regardless of the magnitude, will operate the circuit unless there is a coincident input from the other designated input sources.

Still another object is to provide a coincidence circuit which will operate equally well with negative or positive inputs, is sensitive to small inputs, and which also has a high amplification characteristic.

Other and further objects will appear in the course of the following description when taken with the accompanying drawing which illustrates in schematic circuit form one embodiment of this invention.

In the figure is shown a circuit including a twin-primary pulse transformer 11 and a twin-triode vacuum tube 12, having two grids, two cathodes, and two plates. In the figure the letter A or B has been appended to this latter reference numeral to distinguish the two halves of the tube, which will hereinafter be referred to as tubes 12A and 12B respectively. Cathode heaters and heater circuits, being well-known to those skilled in the art, have been omitted for the sake of simplification of the circuit diagram. The cathodes of both tubes are connected together and to ground through cathode resistor 15 and are also connected to input terminal 16 through coupling condenser 17. A second input terminal 18 is connected through coupling condenser 19 to the grid of tube 12A and to a source of negative biasing potential at terminal 20 through isolating resistor 21. The grid of tube 12B is connected to this same negative potential source at terminal 20 through resistor 22 and condenser 23 in parallel as shown. The impedance of resistor 22 is made equal to that of resistor 21 to make the circuit symmetrical as hereinafter discussed. The capacitance of condenser 23 is made equal to that of the driving source connected to input 18 for the same reason. The plate of tube 12A is connected to a suitable source of positive plate potential at terminal 24 through primary coil 25 of pulse transformer 11, and the plate of tube 12B is connected to the same potential source through primary coil 26. One end of secondary coil 27 of pulse transformer 11 is grounded and the other is connected to terminal 28, which is the output of the coincidence circuit. As shown by the dots at the ends of coils 25, 26, and 27 of pulse transformer 11, primary coils 25 and 26 are wound in opposition to one another, as are primary coil 25 and secondary coil 27. Since the D. C. impedance of resistor 21 has been made equal to that of resistor 22, the grids of both tubes are biased similarly. Further, since the tubes also have a common cathode impedance, they are symmetrical, and if a negative pulse of sufficient magnitude is applied to terminal 16, both tubes will be turned on or conduct and will draw equal amounts of plate current from the source of positive potential at terminal 24. The magnitude of the negative pulse at terminal 16 required to turn the tubes on is controlled by the magnitude of the negative potential applied at terminal 20, which can be varied as desired. Since coils 25 and 26 are wound in phase opposition, and since equal amounts of current pass through each coil due to the symmetry of the tube circuits, it is seen that the effects of these equal currents on secondary coil 27 exactly balance one another, resulting in no pulsed voltage output at terminal 28. However, it is to be noted that both tubes are now conducting and by suitable choice of circuit parameters can be and in operation preferably are made to operate in the high transconductance region of their characteristics. Under these conditions any pulse, positive or negative, applied to terminal 18 will produce an amplified output of the same polarity at terminal 28. This is because varying the potential at the grid of tube 12A by the application of a pulse to terminal 18 produces an increased or decreased current flow (depending upon whether the applied pulse is positive or negative respectively) through that tube and hence through primary coil 25 alone. It is to be noted that no pulse is applied to the grid of tube 12B (and hence there is no change in current flow through primary coil 26) due to the presence of isolating resistor 21. This change in current through coil 25 produces a change in the lines of flux in pulse transformer 11 according to conventional electromagnetic theory and hence produces an output of the same polarity across secondary coil 27 and at terminal 28 due to the way in which the coils are wound and also due to the lack of an opposing flux being set up in the transformer by primary coil 26. Since tube 12A was operating in the region of its high transconductance characteristic, it amplifies the pulse passed, and still further amplification may be gained if desired by the use of a suitable turns ratio between coils 25 and 27. Thus this coincidence circuit has an advantage over prior coincidence circuits in that it operates like a single high gain amplifier stage. Also, this circuit is extremely sensitive to small inputs applied to terminal 18 due to the operation of tube 12A in its high transconductance characteristic as above-mentioned. From the preceding discussion it is thus apparent that this coincidence circuit requires two conditions for its operation: first, a negative pulse applied to the cathodes to turn tubes 12A and 12B on, and second, a pulse, coincident in time, which may be either positive or negative, applied to the grid of tube 12A. It is desirable to limit this latter pulse if positive to a value less than the bias present on tube 12A, since otherwise the circuit could be operated by a single large positive pulse applied to the grid of tube 12A. If there is any possibility of such large positive pulses being applied to input terminal 18, a limiter circuit, well-known to the art, may be incorporated in the input circuit just ahead of terminal 18. It is to be noted that no such limiter is required for negative pulses applied at this terminal because no negative pulse, regardless of its magnitude, can operate this coincidence circuit in the absence of a coincident negative pulse applied to input terminal 16 to turn tube 12A on.

As is evident to those skilled in the art, the embodiment above-described would operate equally well with a single center-tapped primary coil pulse transformer. Referring to Fig. 1, coil 26 could be eliminated and coil 25 center-tapped, this center-tap being connected to terminal 24. The plate of tube 12B would then be connected to the upper end of coil 25 (which is shown in Fig. 1 connected to terminal 24), the resultant circuit being that of a conventional push-pull transformer, which is merely one of the general class of push-pull devices.

It is to be understood that while the operation of the above embodiment of this invention has been described with reference to a single set of two pulses occurring and being applied simultaneously to the circuit, the embodiment is operable with a plurality of successive sets of pulses. Also, while the operation has been described in terms of pulse inputs, this embodiment will work equally well with inputs having other wave shapes. Further, while a specific embodiment has been described as required by the patent statutes, the principles of this invention are of much broader scope. Numerous additional specific applications will occur to those skilled in the art and no attempt has been made to exhaust such possibilities. The scope of the invention is defined in the following claims.

What is claimed is:

1. A coincidence circuit comprising, a pair of vacuum tubes, means combining the outputs of said tubes in phase opposition, means biasing said tubes below cut off, means for rendering both of said tubes simultaneously conducting in the high transconductance region of their characteristic in response to an input pulse thereto thereby producing a no output pulse in said combining means, and means for varying the conduction of one of said tubes in response to a second pulse occurring simultaneously with said first pulse to furnish an output pulse.

2. A coincidence circuit comprising, a push-pull device, two vacuum tubes, means for connecting said push-pull device to the plate circuits of said tubes, means biasing said tubes to be normally non-conducting, means for rendering both of said tubes conducting in the high transconductance region of their characteristic in response to an input pulse whereby the plate current of each of said tubes flows through said push-pull device in opposition to provide no output, and means for varying the conduction of one of said tubes in response to a second simultaneous input pulse to provide an output.

3. A coincidence circuit comprising, a push-pull pulse transformer including a secondary coil with one end grounded and two oppositely phased primary coils, two triode vacuum tubes, each having a grid, plate, and cathode, both cathodes being connected together and to ground through a common cathode impedance, means applied to both grids for biasing both tubes equally below cut-off, isolating means between said grids, a source of positive potential connected to one plate through one of said primary coils and to the other plate through the other of said primary coils, means applying a negative pulse simultaneously to both cathodes to render both tubes conducting in the high transconductance region of their characteristic, means applying a second pulse of any polarity simultaneously to the grid of one of said tubes to vary the amount of its conduction to produce an output across said secondary coil.

4. A coincidence circuit comprising, a push-pull transformer including a secondary coil with one end grounded and a center-tapped primary coil, a source of positive potential applied to the center-tap of said primary coil, two triode vacuum tubes, each having a grid, plate, and cathode, one plate being connected to one end of said primary coil and the other plate to the other end, both cathodes being connected together and to ground through a common cathode impedance, means applied to both grids for biasing both tubes equally below cut-off, and isolating means between said grids, means applying a negative pulse simultaneously to both cathodes to render both tubes conducting in the high transconductance region of their characteristic and means applying a second pulse of any polarity simultaneously to the grid of one of said tubes to vary the amount of its conduction to produce an output across said secondary coil.

5. A circuit for producing an output signal in response to an input signal from a first source occurring simultaneously with an input signal from a second source comprising electron tubes having opposed output circuits, means for applying said first signal to said tubes for rendering said tubes equally conducting, and means for applying said second signal to one of said tubes for rendering said tubes unequally conducting.

6. An electron tube circuit for producing an output signal in response to an input signal from a first source occurring simultaneously with an input signal from a second source comprising electron tubes connected with common bias circuits, opposing output circuits and isolated input circuits, means to bias said tubes to be normally non-conducting, means to apply signals from said first source to bias said tubes to be conducting, and means to apply signals from said second source to one of said input circuits.

7. An electron tube circuit for producing an output signal in response to an input signal from a first source occurring simultaneously with an input signal from a second source comprising two electron tubes connected with common cathode circuits, opposing plate circuits and isolated control grid circuits, means to bias said tubes to be normally non-conducting, means applying signals from said first source to said cathode circuit to bias said tubes to be conducting, and means applying signals from said second source to one of said control grid circuits.

LEON BESS.

REFERENCES CITED

The following references are of record in the file of this patent:

UNITED STATES PATENTS

| Number | Name | Date |
|---|---|---|
| 1,801,774 | Latour | Apr. 21, 1931 |
| 2,142,940 | Hackenberg et al. | Jan. 3, 1939 |
| 2,181,328 | Hermann | Nov. 28, 1939 |
| 2,223,430 | Smith | Dec. 3, 1940 |
| 2,360,466 | Bedford et al. | Oct. 17, 1944 |
| 2,392,546 | Peterson | Jan. 8, 1946 |

Certificate of Correction

Patent No. 2,538,500 January 16, 1951

LEON BESS

It is hereby certified that error appears in the printed specification of the above numbered patent requiring correction as follows:

Column 4, line 11, after the word "producing" strike out *a*; line 44, for the word and comma "characteristic," read *characteristic and*;

and that the said Letters Patent should be read as corrected above, so that the same may conform to the record of the case in the Patent Office.

Signed and sealed this 24th day of July, A. D. 1951.

[SEAL]

ERNEST F. KLINGE,
*Assistant Commissioner of Patents.*